United States Patent
Alpert et al.

(10) Patent No.: US 10,193,968 B2
(45) Date of Patent: Jan. 29, 2019

(54) VIRTUAL ROUTER WITH DYNAMIC FLOW OFFLOAD CAPABILITY

(71) Applicant: Google LLC, Mountain View, CA (US)

(72) Inventors: Jesse Louis Alpert, Even Yehuda (IL); Uday Naik, Fremont, CA (US); Md Ahsan Arefin, Santa Clara, CA (US); David Andrew Schultz, Sunnyvale, CA (US); Yossi Richter, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/294,494

(22) Filed: Oct. 14, 2016

(65) Prior Publication Data

US 2018/0109606 A1    Apr. 19, 2018

(51) Int. Cl.
*H04L 29/08* (2006.01)
*H04L 12/851* (2013.01)
(Continued)

(52) U.S. Cl.
CPC ...... *H04L 67/1025* (2013.01); *H04L 12/4641* (2013.01); *H04L 43/026* (2013.01);
(Continued)

(58) Field of Classification Search
CPC ............. H04L 67/1025; H04L 12/4641; H04L 43/0894; H04L 43/16; H04L 45/02; H04L 45/16; H04L 45/38; H04L 45/586
See application file for complete search history.

(56) References Cited

U.S. PATENT DOCUMENTS 7,801,155 B2    9/2010  Wang
7,822,033 B1 *  10/2010  Parker ............... H04L 29/12283
                                                   370/389

(Continued)

FOREIGN PATENT DOCUMENTS

CN          102546355 A      7/2012
WO      WO 2013/097900       7/2013
WO      WO 2014/139558       9/2014

OTHER PUBLICATIONS

Bozakov and Papadimitriou, "OpenVRoute: An Open Architecture for High-performance Programmable Virtual Routers," (2013) [online] (retrieved from https://www.ikt.uni-hannover.de/uploads/tx_tkpublikationen/hpsr_2013.pdf), 6 pages.

(Continued)

*Primary Examiner* — Ronald B Abelson
(74) *Attorney, Agent, or Firm* — Fish & Richardson P.C.

(57) ABSTRACT

Systems and methods for dynamically offloading network traffic flows in one or more virtual networks are disclosed. An example method begins with identifying a virtual router through which to route network traffic of a specific network flow, wherein the specific network flow has a source endpoint existing on a source host machine and a destination endpoint existing on a destination host machine. Flow statistics including statistics about the specific network flow are received. A determination is made as to whether the specific network flow meets an offload rule using the received flow statistics. In response to determining that the specific flow meets the offload rule, the specific network flow is offloaded from the virtual router.

36 Claims, 4 Drawing Sheets

(51) Int. Cl.
*H04L 12/721* (2013.01)
*H04L 12/46* (2006.01)
*H04L 12/26* (2006.01)
*H04L 12/751* (2013.01)
*H04L 12/761* (2013.01)
*H04L 12/713* (2013.01)

(52) U.S. Cl.
CPC .......... *H04L 43/0894* (2013.01); *H04L 43/16* (2013.01); *H04L 45/02* (2013.01); *H04L 45/16* (2013.01); *H04L 45/38* (2013.01); *H04L 45/586* (2013.01); *H04L 47/2483* (2013.01)

(56) References Cited

U.S. PATENT DOCUMENTS

| | | | |
|---|---|---|---|
| 9,092,269 | B2 | 7/2015 | Kandula et al. |
| 2002/0001310 | A1* | 1/2002 | Mai ............... H04L 12/1836 370/390 |
| 2003/0101265 | A1* | 5/2003 | Dantzig ............ G06F 9/505 709/226 |
| 2004/0018841 | A1* | 1/2004 | Trossen ........... H04W 36/0016 455/436 |
| 2007/0133577 | A1 | 6/2007 | Dong |
| 2011/0058479 | A1 | 3/2011 | Chowdhury |
| 2011/0320632 | A1 | 12/2011 | Karino |
| 2013/0254766 | A1 | 9/2013 | Zuo et al. |
| 2013/0343399 | A1 | 12/2013 | Kandula et al. |
| 2014/0036663 | A1* | 2/2014 | Narayanan ........... H04L 45/125 370/230 |
| 2014/0071980 | A1* | 3/2014 | Kovalenko ........ H04M 3/5237 370/352 |
| 2014/0089506 | A1 | 3/2014 | Puttaswamy Naga et al. |
| 2014/0146668 | A1* | 5/2014 | Park ................. H04W 28/0268 370/230 |
| 2014/0362686 | A1 | 12/2014 | Jogalekar et al. |
| 2015/0006705 | A1 | 1/2015 | Antony |
| 2016/0036732 | A1 | 2/2016 | Lu |
| 2017/0195288 | A1* | 7/2017 | Libby ................ H04W 12/06 |
| 2017/0214613 | A1* | 7/2017 | Zhang ............... H04L 12/4633 |

OTHER PUBLICATIONS

Casado et al., "Ethane " Taking Control of the Enterprise, (2007) [online] (retrieved from http://simula.stanford.edu/~jyluo/publications/ethane_sigcomm_2007.pdf), 12 pages.

Egi et al., "Towards High Performance Virtual Routers on Commodity Hardware," (2008) [online] (retrieved from http://www0.cs.ucl.ac.uk/staff/M.Handley/papers/vrouters-conext.pdf), 12 pages.

Gupta et al., "Efficient Routing for Peer-to-peer Overlays," (2004) [online] (retrieved from http://www.well.ox.ac.uk/~anjali/nsdi-onehop.pdf), 14 pages.

Stoica et al., "Chord: A Scalable Peer-to-peer Lookup Service for Internet Applications," (2001) [online] (retrieved from https://pdos.csail.mit.edu/papers/chord:sigcomm01/chord_sigcomm.pdf), 12 pages.

Zhou, "Datacenter Network Large Flow Detection and Scheduling from the Edge," (2014) [online] (retrieved from https://cs.brown.edu/research/pubs/theses/masters/2014/zhou.ray.pdf), 14 pages.

"Cisco Active Network Abstraction Reference Guide, 3.7," (2014) [online] (retrieved from http://www.cisco.com/c/en/us/td/docs/net_mgmt/active_network_abstraction/3-7/reference/guide/ANARefGuide37/vrf.html), 6 pages.

"CLI Book 2: Cisco ASA Series Firewall CLI Configuration Guide, 9.5," (2016) [online] (retrieved from http://www.cisco.com/c/en/us/td/docs/security/asa/asa95/configuration/firewall/asa-95-firewall-config/conns-connlimits.html), 26 pages.

"Flow Offloading," (2014) [online] (retrieved from http:/www.juniper.net/techpubs/en_US/junos15.1/topics/task/configuration/services-flows-offloading.html), 1 page.

"SDN Optimization Demo of Hybrid Packet/Optical Fibers," (Oct. 12, 2016) [online] (retrieved from https://www.sdxcentral.com/resources/sdn-demofriday/calient-cumulus-immon-sdn-optimization-hybrid-packetoptical-data-center-fabric/) 3 pages.

"Virtual Routing and Forwarding—Wikipedia the free encyclopedia," (Oct. 12, 2016) [online] (retrieved from https://en.wikipedia.org/wiki/Virtual_routing_and_forwarding), 2 pages.

'www.netronome.com' [online] "What Makes a NIC a SmartNic, and Why is it Needed?," Nick Tausanovitch, Sep. 13, 2016, [retrieved on Jan. 1, 2018] Retrieved from Internet: URL<www.netronome.com/blog/what-makes-a-nic-a-smartnic-and-why-is-it-needed> 7 pages.

Hamadi et al. "Fast path acceleration for open vSwitch in overlay networks," IEEE Global Information Infrastructure and Networking Symposium, Sep. 15, 2014, 5 pages.

International Search Report and Written Opinion issued in International Application No. PCT/US2017/053977, dated Jan. 17, 2018, 15 pages.

Tofigh et al. "The Need for Complex Analytics from Forwarding Pipelines," Open Networking Summit, Mar. 17, 2016, 17 pages.

Irish Search Report issued in Application No. 2017/0217, dated Feb. 22, 2018, 5 pages.

Office Action and Search Report issued in British Application No. GB1716632.3, dated Mar. 5, 2018, 5 pages.

'www.slideshare.net' [online] "The Need for Complex Analytics from Forwarding Pipelines," Mar. 17, 2016, [retrieved on Aug. 14, 2018] Retrieved from Internet: URL<https://www.slideshare.net/Netronome/the-need-for-complex-analytics-from-forwarding-pipelines> 7 pages.

SG Search Report and Opinion issued in Singaporean Application No. 10201708478x, dated Jun. 29, 2018, 10 pages (English Translation).

* cited by examiner

VIRTUAL ROUTER WITH DYNAMIC FLOW OFFLOAD CAPABILITY

BACKGROUND

Computing devices in a software-defined network may not have physical connections, but may be virtually linked to one another. Software-defined networking allows networks to be managed through abstraction of lower level functionality. A control plane in a virtual network usually makes decisions about how to route data packets of network traffic from a source virtual machine in the network to a destination virtual machine. A data plane forwards network traffic to selected destinations. In a software-defined network, methods of network virtualization decouple the control plane of a network from the data plane. Therefore, virtual networks typically have address spaces that bear little resemblance to the topology of the underlying physical network which means that traditional techniques for making networks scale do not work for virtual networks. As a result, routing network traffic through large virtual networks can be problematic using conventional network traffic routing models.

SUMMARY

This specification describes technologies relating to routing virtual network traffic in general, and specifically to systems and methods for scaling virtual networks by using virtual routers and flow offloading to route network traffic.

An example implementation uses virtual routers and dynamic offloading to route packets through networks. The example implementation is advantageous because it improves the programming latency, which is the amount of time it takes to program changes in a virtual network, and scalability of virtual networks.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

Figure 1:
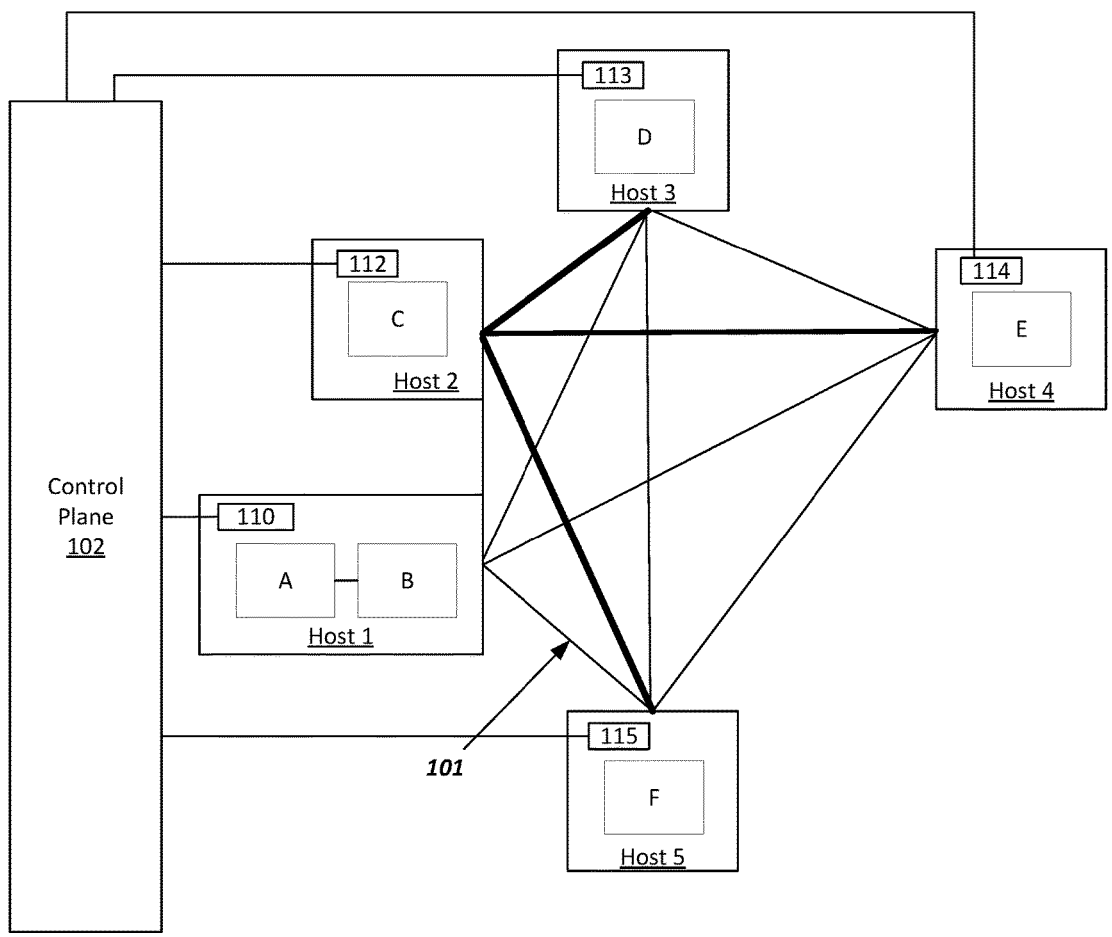
FIG. 1 illustrates one configuration of a virtual network.

FIG. 1 illustrates one configuration of a virtual network. A virtual network is an abstraction on top of a physical network made up of multiple virtual machines running on multiple host machines. Host machines are connected via a physical network, which consists of top-of-rack switches, routers, and other network entities.

In FIG. 1, virtual machines A and D are in different host machines (Host_1 and Host_3). Virtual machines can exist in different host machines in one or more clusters. FIG. 1 illustrates direct routes between host machines that are point-to-point tunnels. As used in this description, a direct route is a route between two host machines that does not include routing through one or more virtual routers. These tunnels may use a tunnel protocol such as generic routing encapsulation (GRE) which is a tunneling protocol that can encapsulate a wide variety of network layer protocols inside virtual point-to-point links over an internet protocol network. Point-to-point tunnels between hosts machines allow virtual machines in the same network to communicate with one another. For example, direct route 101 connects Host_1 and Host_5. In this example, direct route 101 allows virtual machines A and B to communicate with virtual machine F. Generally, there is not a direct physical link between two hosts so packets between the two hosts will traverse at least one intermediate switch.

Each machine that hosts a virtual machine in the network has a programmable software switch 110, 112, 113, 114, and 115. A control plane (102) in the network can install routing flows on these switches 110, 112, 113, 114, and 115. Each routing flow defines how to route network traffic between two virtual machines in the network by providing a specific path for network packets to traverse in order for data packets to be sent from a source virtual machine to a destination virtual machine.

For example, in FIG. 1, Host_2 has an IP address 10.0.0.2 in the physical network and Host_3 has a IP address 10.0.0.3. Virtual machine C has a virtual IP address 10.240.3.3 and virtual machine D has a virtual IP address 10.240.4.4 within the same virtual network.

If virtual machine C needs to send a packet to virtual machine D, the most direct way for the switch (112) to forward the packet is for virtual machine C to encapsulate the packet using generic routing encapsulation and send the packet to Host_3's physical IP address, 10.0.0.3. The path from Host_2 to Host_3 may traverse multiple physical network links, but have a direct virtual path from Host_2 to Host_3.

However, if Host_2, hosting virtual machine C, does not know the host hosting virtual machine D, Host_2 may instead send the packet to a virtual router, over potentially multiple physical links. The virtual router would be responsible for further forwarding. This traversal through a virtual router is not a direct virtual path.

Figure 2:
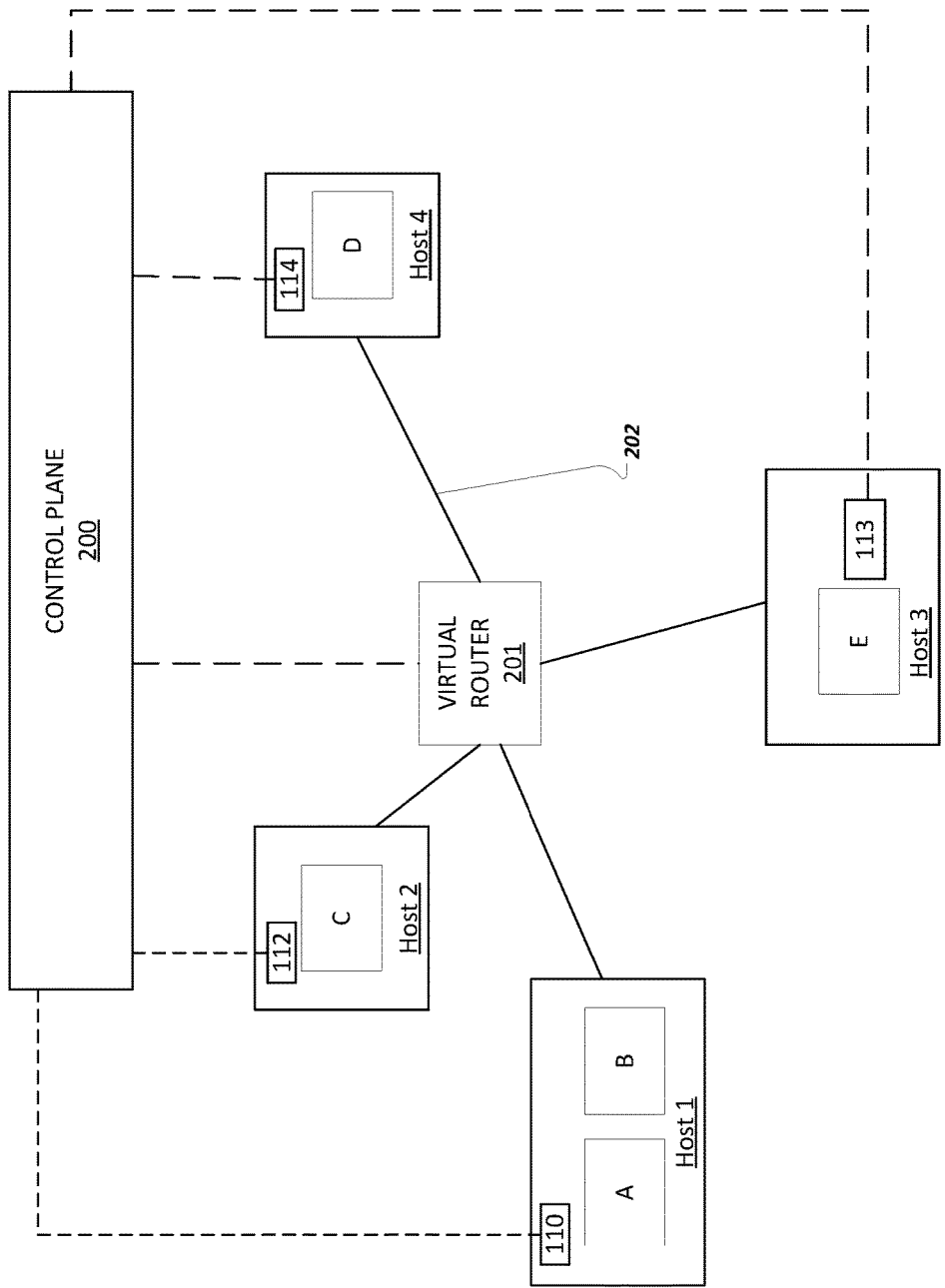
FIG. 2 illustrates a configuration of an example virtual network.

FIG. 2 illustrates a configuration of an example network. In an example virtual network model, at least one virtual router (201) is installed to enable virtual networks to route network traffic packets through the networks. Virtual routers run on dedicated hardware and act much like routers for physical networks. Virtual machines do not need to be directly connected to a virtual router, but can forward packets to a virtual router using a default routing flow provided by the control plane.

This virtual network model supports multi-tenancy which means that virtual routers and hosts are shared by multiple customers running virtual machines in different virtual networks. For example, there may be ten virtual routers in a physical cluster and that cluster may have thousands of hosts and thousands of virtual networks.

Routing decisions for routing flows are made by the on-host switch. If the switch knows the physical IP address that hosts the destination virtual machine for a particular packet, the switch sends the packet over a GRE tunnel to the destination host. Otherwise, the switch sends the packet over a GRE tunnel to a virtual router. By sending network traffic through a virtual router, each virtual machine in the network does not need a complete routing table or a direct route to every other virtual machine in the network.

On startup, each virtual router communicates with the control plane (200) of the virtual network to let the control plane know that the router is ready to serve network traffic. The control plane keeps a list of virtual routers in the virtual network and information about each router including the location and the status of the virtual router. Additionally, the control plane can send a full configuration of the virtual network to each virtual router. Each virtual router may be able to forward network traffic packets from any source virtual machine to any destination virtual machine in the network.

In the example virtual network, each virtual machine A-E has a default routing flow (202) through at least one virtual router (201). This default routing flow may be provided to each host machine hosting a virtual machine in the network by the control plane. Additionally or alternatively, each host can choose a virtual router (201) to which the host routes packets from the list of virtual routers maintained by the control plane (200) based on characteristics of the packets needing to be routed and the flow key or keys of the virtual router defining network traffic the virtual router is programmed to handle.

Figure 3:
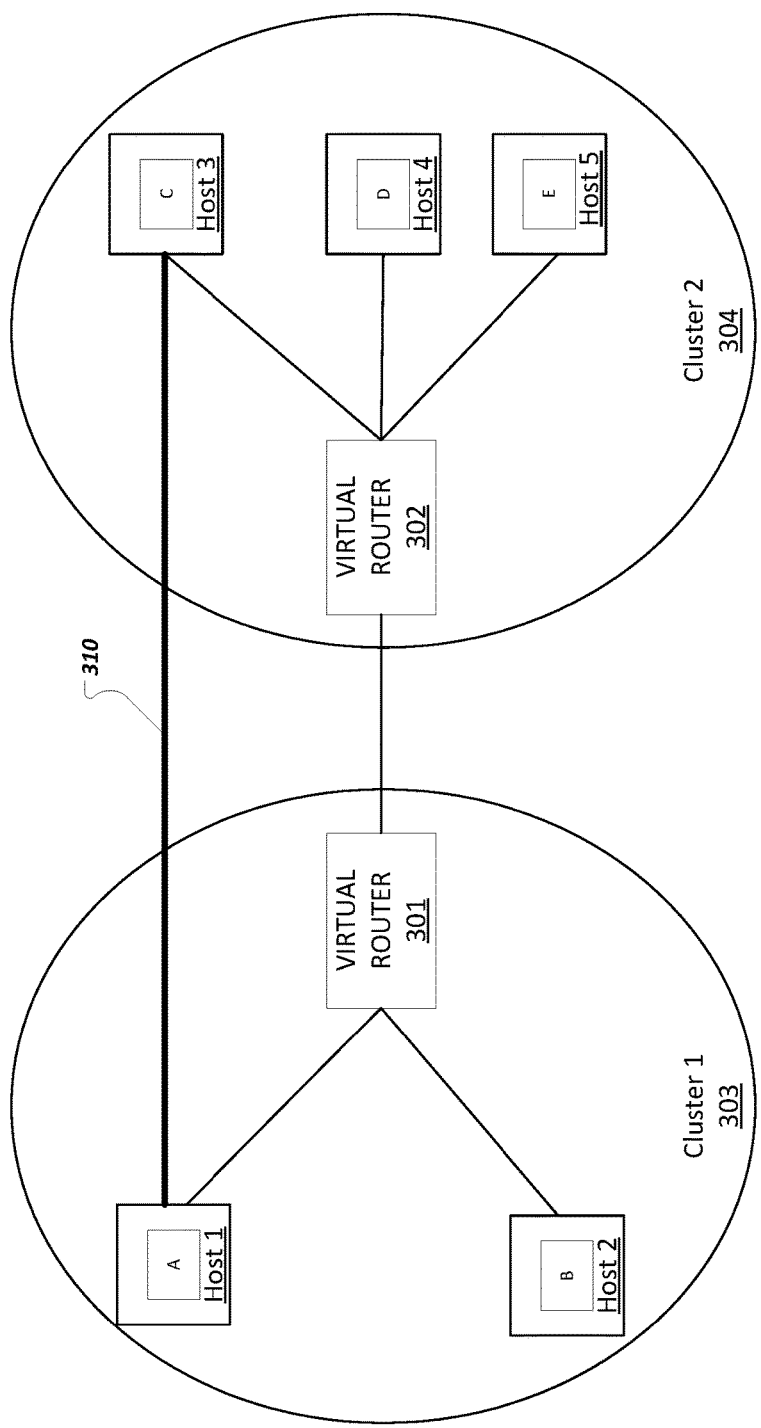
FIG. 3 illustrates a configuration of an example virtual network in multiple clusters.

FIG. 3 illustrates a configuration of an example network with multiple clusters. A cluster is a collection of physical machines connected by a high-speed network, typically within a single building. Network latencies within a cluster are much better than across clusters. In an example network, a source virtual machine can send network traffic to destination virtual machines in the network that exist in different clusters from the source virtual machine. For example, source virtual machine A may have network packets destined for virtual machine D, which is in a different cluster from virtual machine A. To transmit network traffic from virtual machine A to virtual machine D, virtual machine A first sends network traffic to a virtual router (301) in the local cluster (303) of the source virtual machine. The source cluster virtual router (303) then sends the network traffic to a virtual router (302) in the destination cluster (304). The destination cluster virtual router (302) will then send the network traffic to the destination virtual machine D.

In an example network, load through virtual routers may be load-balanced by the hosts. For example, if there are three virtual routers, a host might try to split traffic evenly across them. To split the traffic, the host might hash an n-tuple flow key that defines a flow and use the hash to choose a router load balancing on virtual routers is accomplished by equal-weight, 5-tuple, stateless load-balancing. Each n-tuple flow key may be in the form of, for example, a 3-tuple flow key defined by <sourceIP address, destination IP address, IP protocol>, or a 5-tuple flow key defined by <source IP address, destination IP address, IP protocol, source transport port, destination transport port>. In order to determine load-balancing of a flow, a host may hash of a packet's flow key. If the hash is within the first one third of the hash range, the packet may be sent to the first router. If the hash falls within the second one third of the hash range, the packet may be sent to the second router and so on.

In some implementations, the control plane may program the switch on each host machine to send only certain types of network traffic to a specific virtual router. For example, packets to a specific destination network prefix may be directed to a specific router. In a multitenant system, traffic from certain networks may be directed to specific routers. In these cases, a virtual router only needs to handle certain network traffic. In some implementations, packets to a specific destination IP range may use an advanced routing feature that the virtual router does not support and therefore the packets will not be routed through the virtual router.

Load-balancing across multiple clusters may be handled by dividing the network traffic across virtual machines in each cluster. For example, a route may have five destinations: two virtual machines in cluster 1 and three virtual machines in cluster 2. If a source virtual machine in cluster 1 sends network traffic that matches the route, the virtual routers in cluster 1 must distribute ⅕ of the traffic to each of the virtual machines in cluster 1 and ⅗ virtual routers for cluster 2. Upon receiving the flows from the virtual routers in cluster 1, the virtual routers in cluster 2 divide the flows equally among the three virtual machines in cluster 2.

In some implementations, virtual machine hosts, virtual routers, or other network entities monitor network traffic flows and reports flow statistics to the control plane. These entities can collect flow usage information for each virtual machine to virtual router flow. In each reporting interval, entities monitoring network traffic flows can collect other information including: the source switch port, the destination virtual IP address, and the number of bytes and packets in the reporting interval. Each flow can be defined by source virtual machine/virtual router virtual IP pair. In a host, the programmable software switch may collect flow usage information. A network entity, such as a virtual router or virtual host, may be programmed with a configurable bandwidth threshold, i.e., 20 kbps or 100 kbps.

Additionally or alternatively, flow usage information may be derived from sampling (e.g., netflow or sflow) rather than by collecting exact packet or byte counts. In a sampling implementation, a host or a router reports a certain fraction of packets, e.g., 1 in 10,000, and the entity collecting the sample can estimate flow bandwidth for each flow based on the number of samples received to determine a configurable bandwidth threshold.

As described, the configurable bandwidth threshold may be programmed by a network administrator or learned in the virtual network. In one implementation, the configurable threshold is statically configured. In another implementation, the control plane can adaptively set the threshold based on a number of factors such as the amount of bandwidth going through the virtual routers and the current number of offload flows.

Each network entity, such as a virtual machine host or virtual router, can monitor flow usage information to determine network traffic flows that exceed this configurable bandwidth threshold. If a network traffic flow does exceed the configurable bandwidth threshold, the network traffic flow is considered a high-bandwidth flow and the entity that made the determination reports the flow to the control plane.

The control plane receives flow statistics from network entities and can offload flows from virtual routers that meet offload criteria. When a network flow meets offload criteria, the control plane programs direct routes between the sending host and the destination host of the network flow.

As described above, FIG. 3 illustrates a configuration of an example network with multiple clusters. This figure shows an example virtual network with flows through a virtual router (301 and 302) and flows through a direct route (310). As described above, if virtual machine A has network flow traffic destined for virtual machine D, virtual machine A will send the network flow traffic to virtual router 301. Virtual router 301 will send the network flow traffic to virtual router 302, which will in turn send the traffic to virtual machine D. If virtual machine A has network flow traffic destined for virtual machine C, there are 2 routes that could be taken, a first route from virtual machine A to virtual router 301 to virtual router 302 and then to virtual machine C and a second route directly from Host_1 hosting virtual machine A to Host_3 hosting virtual machine C. The control plane contains the routing table for the network, which defines the rules for routing a packet. The rules for sending network traffic from a virtual machine to a virtual router have a lower priority than virtual machine to virtual machine forwarding rules, which is the on-demand learned rules for direct flow. Therefore, network flow traffic from virtual machine A destined to virtual machine C will use the offloaded virtual machine-to-virtual machine direct route.

Flows that meet certain offload criteria will be offloaded from virtual routers. Most often, these flows will be high-bandwidth flows as determined by flows that meet or exceed the configurable bandwidth threshold. However, the control plane can dynamically make the decision to offload a network flow based on other flow statistics.

Figure 4:
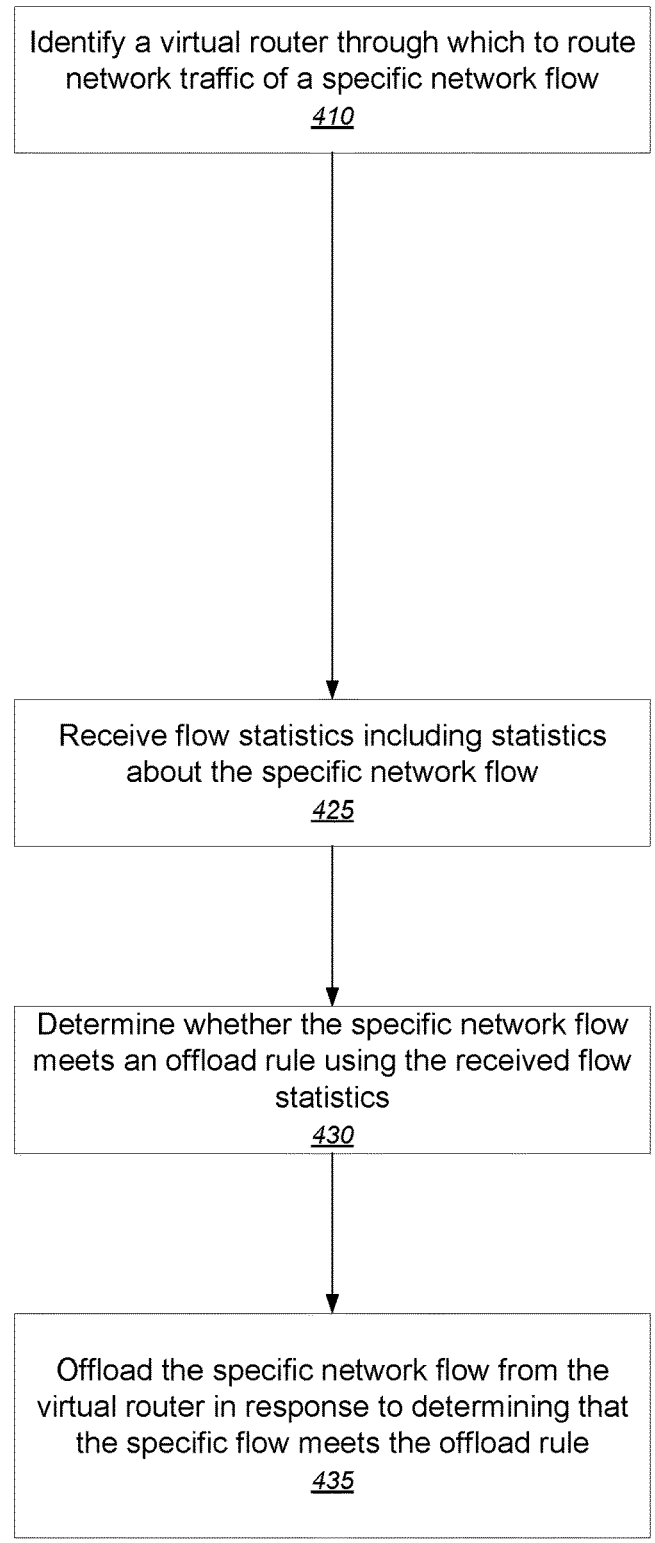
FIG. 4 is a flow diagram of an example method for dynamically offloading network traffic flows in a virtual network.

FIG. 4 is a flow diagram of an example method for dynamically offloading network traffic flows in a virtual network. A source virtual machine may have data to send to a destination virtual machine. In an example virtual network, a control plane identifies a virtual router through which to route network traffic of a specific network flow from the source virtual machine to the destination virtual machine (410). The host machine then transmits the specific network flow traffic from the source virtual machine to the identified virtual router, which forwards the specific network flow traffic to the destination virtual machine. The host machine monitors flow statistics of the specific network flow from the source virtual machine to the identified virtual router to determine whether a flow exceeds the configurable bandwidth threshold. If the flow exceeds the configurable bandwidth threshold, the host reports the flow to the control plane. The control plane receives flow statistics about the virtual network including statistics about the specific network flow (425).

In order to determine whether a flow should be offloaded, the control plane determines whether the network flow meets an offload rule (430). The control plane may only consider offloading network flows that have already been determined to be high-bandwidth flows by exceeding a configurable bandwidth threshold as described above. The control plane also considers several flow statistics in an offload rule determination including: the bandwidth of each flow, the aggregate bandwidth going through each virtual router, and the number of flows already offloaded. Information about flow bandwidth can come from a variety of sources including virtual machines, hosts, from a router on the physical host where the destination virtual machine is located, from a switch, from network monitoring systems, or from the virtual routers themselves.

A configurable offload rule may be set by a network administrator or dynamically learned by the control plane based on the flow statistics. A control plane will offload flows that meet the criteria of a given offload rule. For example, an offload rule may be to offload any flow that exceed 20 kbps. Another offload rule may be to offload a flow that exceed 20 kbps unless more than 20 flows have already been offloaded for the source host of the flow. An additional offload rule may be to offload a high-bandwidth flow when the aggregate bandwidth going through the virtual router that the high-bandwidth flow is using exceeds a configurable bandwidth threshold for the virtual router.

An offload rule may be determined by the control plane dynamically based on factors such as: the aggregate bandwidth currently traveling through a virtual router, the number of flows already offloaded to the given source host, the total number of offloaded flows in the control plane, and other flow statistics.

In some implementations, a control plane can preprogram direct routes. For example, the control plane may program direct routes for all virtual machines in the same subnetwork if the subnetwork is sufficiently small. In another example, the control plane may program direct routes for all virtual machines in the same network if the network is sufficiently small.

As described above, the control plane offloads flows that meet offload rules or are preprogrammed by installing direct routes between sending hosts and destination hosts. Once a network flow is offloaded, subsequent traffic of the network flow routes directly from host of the source virtual machine to the host of the destination virtual machine without going through any virtual routers.

The control plane can expire and remove offloaded flows for various reasons including determining that the offloaded flow is no longer needed. An example system removes offloaded flows when the source or destination virtual machine of the flow has been deleted. In some networks, an offload flow can become invalid when the network configuration changes. Flow usage statistics can also be used to determine whether to expire or remove an offloaded flow. As described above, flow usage statistics can be collected or sampled in order to determine the usage of each flow. An offloaded flow can be expired/removed if it has been idle a predetermined amount of time or if it has been used below a threshold amount for a predetermined amount of time.

Host machines need to quickly detect and react to virtual router failures in order to continue routing network traffic. To determine virtual router failures, the programmable software switch on each host can establish a connection to each virtual router in its local cluster and use inline health checks to detect failures. Cross-cluster flows require sending network traffic to remote-cluster virtual routers. Therefore, each virtual router needs to health-check all remote-cluster virtual routers. To check on the health of a virtual router, each host sends a message to the router periodically. The virtual router replies with an affirmative or negative response or no response if the virtual router has failed completely. The control plane provides a complete list of available virtual routers in the cluster. Hosts load-balance packets across routers that they determine to be healthy according to the results of the health checks.

Although aspects of the invention have been described in terms of source virtual machines and destination virtual machines, the invention can be used with any virtual network or overlay network, regardless of whether the endpoints of a flow in the network are virtual machines. For example, the endpoints may be processes, not running in virtual machines, that communicate with each other by means of virtual internet protocol addresses.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on instance data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Embodiment 1 is a computer-implemented method comprising:

identifying a virtual router through which to route network traffic of a specific network flow, wherein the specific network flow has a source endpoint existing on a source host machine and a destination endpoint existing on a destination host machine;

receiving flow statistics including statistics about the specific network flow;

determining whether the specific network flow meets an offload rule using the received flow statistics; and offloading the specific network flow from the virtual router in response to determining that the specific flow meets the offload rule.

Embodiment 2 is the computer-implemented method of claim 1, wherein offloading the specific network flow from the virtual router further comprises:

creating a direct route between the source host machine and the destination host machine through which to route the specific network flow; and routing subsequent specific network flow traffic through the direct route instead of the virtual router.

Embodiment 3 is the computer-implemented method of claim 1, wherein the virtual router is identified based on characteristics of the specific network flow and at least one flow key of the virtual router defining network traffic that the virtual router is programmed to handle.

Embodiment 4 is the computer-implemented method of claim 1, wherein determining whether the specific network flow meets an offload rule includes:

comparing the specific network flow bandwidth with a predefined bandwidth; and determining that the specific network flow exceeds a bandwidth network flow when the specific network flow bandwidth is greater than the predefined bandwidth.

Embodiment 5 is the computer-implemented method of claim 1, wherein receiving flow statistics includes receiving statistics about the bandwidth of the specific network flow.

Embodiment 6 is the computer-implemented method of claim 1, wherein determining whether the specific network flow meets an offload rule includes:

determining an aggregate bandwidth flowing through the virtual router; and determining whether the aggregate bandwidth exceeds a threshold bandwidth for the virtual router.

Embodiment 7 is the computer-implemented method of claim 1, wherein determining whether the specific network flow meets an offload rule includes:

determining the number of network flows that have already been offloaded for the source host machine of the specific network flow; and determining whether the number of offloaded network flows exceeds a threshold amount for the source host machine.

Embodiment 8 is the computer-implemented method of claim 1, wherein flow statistics are received from at least one source, wherein the at least one source is: the source or destination virtual machines, the source or destination hosts, a router on the destination host, a programmable software switch on the source or destination host, a network monitoring system, or the virtual router.

Embodiment 9 is the computer-implemented method of claim 1, wherein the source host machine is in a source cluster and the destination host machine is in a destination cluster that is different from the source cluster.

Embodiment 10 is the computer-implemented method of claim 9, wherein identifying a virtual router through which to route network traffic of a specific network flow includes identifying a virtual router in the source cluster and a second virtual router in the destination cluster.

Embodiment 11 is the computer-implemented method of claim 1, wherein the specific network flow has multiple destination virtual machines existing on multiple destination host machines in multiple clusters.

Embodiment 12 is the computer-implemented method of claim 1, further comprising:

expiring or removing the specific flow in response to determining that the specific flow has been idle for a predetermined amount of time.

Embodiment 13 is the computer-implemented method of claim 1, further comprising:

expiring or removing the specific flow in response to determining that the specific flow has been used below a threshold amount for a predetermined amount of time.

Embodiment 14 is a system comprising:

one or more computers; and one or more storage devices storing instructions that are operable, when executed by the one or more computers, to cause the one or more computers to perform operations comprising:

identifying a virtual router through which to router network traffic of a specific network flow, wherein the specific network flow has a source endpoint existing on a source host machine and a destination endpoint existing on a destination host machine;

receiving flow statistics including statistics about the specific network flow;

determining whether the specific network flow meets an offload rule using the received flow statistics; and offloading the specific network flow from the virtual router in response to determining that the specific flow meets the offload rule.

Embodiment 15 is the system of claim 14, wherein offloading the specific network flow from the virtual router further comprises:

creating a direct route between the source host machine and the destination host machine through which to route the specific network flow; and routing subsequent specific network flow traffic through the direct route instead of the virtual router.

Embodiment 16 is the system of claim 14, wherein the virtual router is identified based on characteristics of the specific network flow and at least one flow key of the virtual router defining network traffic that the virtual router is programmed to handle.

Embodiment 17 is the system of claim 14, wherein determining whether the specific network flow meets an offload rule includes:

comparing the specific network flow bandwidth with a predefined bandwidth; and determining that the specific network flow exceeds a bandwidth network flow when the specific network flow bandwidth is greater than the predefined bandwidth.

Embodiment 18 is the system of claim 14, wherein receiving flow statistics includes receiving statistics about the bandwidth of the specific network flow.

Embodiment 19 is the system of claim 14, wherein determining whether the specific network flow meets an offload rule includes:

determining an aggregate bandwidth flowing through the virtual router; and determining whether the aggregate bandwidth exceeds a threshold bandwidth for the virtual router.

Embodiment 20 is the system of claim 14, wherein determining whether the specific network flow meets an offload rule includes:

determining the number of network flows that have already been offloaded for the source host machine of the specific network flow; and determining whether the number of offloaded network flows exceeds a threshold amount for the source host machine.

Embodiment 21 is the system of claim 14, wherein flow statistics are received from at least one source, wherein the at least one source is: the source or destination virtual machines, the source or destination hosts, a router on the destination host, a programmable software switch on the source or destination host, a network monitoring system, or the virtual router.

Embodiment 22 is the system of claim 14, wherein the source host machine is in a source cluster and the destination host machine is in a destination cluster that is different from the source cluster.

Embodiment 23 is the system of claim 22, wherein identifying a virtual router through which to route network traffic of a specific network flow includes a virtual router in the source cluster and a second virtual router in the destination cluster.

Embodiment 24 is the system of claim 14, wherein the specific network flow has multiple destination virtual machines existing on multiple destination host machines in multiple clusters.

Embodiment 25 is the system of claim 14, further comprising:

expiring or removing the specific flow in response to determining that the specific flow has been idle for a predetermined amount of time.

Embodiment 26 is the system of claim 14, further comprising:

expiring or removing the specific flow in response to determining that the specific flow has been used below a threshold amount for a predetermined amount of time.

Embodiment 27 is a non-transitory computer-readable medium storing software comprising instructions executable by one or more computers which, upon such execution, cause the one or more computers to perform operations comprising:

identifying a virtual router through which to route network traffic of a specific network flow, wherein the specific network flow has a source endpoint existing on a source host machine and a destination endpoint existing on a destination host machine;

receiving flow statistics including statistics about the specific network flow;

determining whether the specific network flow meets an offload rule using the received flow statistics; and offloading the specific network flow from the virtual router in response to determining that the specific flow meets the offload rule.

Embodiment 28 is the non-transitory computer-readable medium of claim 27, wherein offloading the specific network flow from the virtual router further comprises:

creating a direct route between the source host machine and the destination host machine through which to route the specific network flow; and routing subsequent specific network flow traffic through the direct route instead of the virtual router.

Embodiment 29 is the non-transitory computer-readable medium of claim 27, wherein the virtual router is identified based on characteristics of the specific network flow and at least one flow key of the virtual router defining network traffic that the virtual router is programmed to handle.

Embodiment 30 is the non-transitory computer-readable medium of claim 27, wherein determining whether the specific network flow meets an offload rule includes:

comparing the specific network flow bandwidth with a predefined bandwidth; and determining that the specific network flow exceeds a bandwidth network flow when the specific network flow bandwidth is greater than the predefined bandwidth.

Embodiment 31 is the non-transitory computer readable medium of claim 27, wherein receiving flow statistics includes receiving statistics about the bandwidth of the specific network flow.

Embodiment 32 is the non-transitory computer readable medium of claim 27, wherein determining the specific network flow meets an offload rule includes:

determining an aggregate bandwidth flowing through the virtual router; and determining whether the aggregate bandwidth exceeds a threshold bandwidth for the virtual router.

Embodiment 33 is the non-transitory computer readable medium of claim 27, wherein determining whether the specific network flow meets an offload rule includes:

determining the number of network flows that have already been offloaded for the source host machine of the specific network flow; and determining whether the number of offloaded network flows exceeds a threshold amount for the source host machine.

Embodiment 34 is the non-transitory computer readable medium of claim 27, wherein flow statistics are received from at least one source, wherein the at least one source is: the source or destination virtual machines, the source or destination hosts, a router on the destination host, a programmable software switch on the source or destination host, a network monitoring system, or the virtual router.

Embodiment 35 is the non-transitory computer readable medium of claim 27, wherein the source host machine is in a source cluster and the destination host machine is in a destination cluster that is different from the source cluster.

Embodiment 36 is the non-transitory computer readable medium of claim 35, wherein identifying a virtual router through which to route network traffic of a specific network flow includes identifying a virtual router in the source cluster and a second virtual router in the destination cluster.

Embodiment 37 is the non-transitory computer readable medium of claim 27, wherein the specific network flow has multiple destination virtual machines existing on multiple destination host machines in multiple clusters.

Embodiment 38 is the non-transitory computer readable medium of claim 27, further comprising:

expiring or removing the specific flow in response to determining that the specific flow has been idle for a predetermined amount of time.

Embodiment 39 is the non-transitory computer readable medium of claim 27, further comprising:

expiring or removing the specific flow in response to determining that the specific flow has been used below a threshold amount for a predetermined amount of time.

While this specification contains many specific implementation details, these should not be construed as limitations on the scope of any invention or on the scope of what may be claimed, but rather as descriptions of features that may be specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for dynamically offloading network traffic flows in one or more virtual networks, the computer-implemented method comprising:
    identifying a virtual router through which to route network traffic of a specific network flow, wherein the specific network flow has a source endpoint existing on a source host machine and a destination endpoint existing on a destination host machine;
    receiving flow statistics of network traffic transiting the virtual router including statistics about the specific network flow;
    determining whether current network traffic of the specific network flow meets an offload rule using the received flow statistics by:
        determining the number of network flows that have already been offloaded for the source host machine of the specific network flow; and
        determining whether the number of offloaded network flows exceeds a threshold amount for the source host machine; and
    in response to determining that the number of offloaded network flows does not exceed a threshold amount for the source host machine, dynamically offloading the specific network flow from the virtual router rule to ensure that subsequent network traffic of the specific network flow does not transit the virtual router.

2. The computer-implemented method of claim 1, wherein offloading the specific network flow from the virtual router further comprises:
    creating a direct route between the source host machine and the destination host machine through which to route the specific network flow; and
    routing subsequent specific network flow traffic through the direct route instead of the virtual router.

3. The computer-implemented method of claim 1, wherein the virtual router is identified based on characteristics of the specific network flow and at least one flow key of the virtual router defining network traffic that the virtual router is programmed to handle.

4. The computer-implemented method of claim 1, wherein determining whether the specific network flow meets an offload rule includes:
    comparing the specific network flow bandwidth with a predefined bandwidth; and
    determining that the specific network flow exceeds a bandwidth network flow when the specific network flow bandwidth is greater than the predefined bandwidth.

5. The computer-implemented method of claim 1, wherein receiving flow statistics includes receiving statistics about the bandwidth of the specific network flow.

6. The computer-implemented method of claim 1, wherein determining whether the specific network flow meets an offload rule includes:
    determining an aggregate bandwidth flowing through the virtual router; and
    determining whether the aggregate bandwidth exceeds a threshold bandwidth for the virtual router.

7. The computer-implemented method of claim 1, wherein flow statistics are received from at least one source, wherein the at least one source is: the source or destination virtual machines, the source or destination hosts, a router on the destination host, a programmable software switch on the source or destination host, a network monitoring system, or the virtual router.

8. The computer-implemented method of claim 1, wherein the source host machine is in a source cluster and the destination host machine is in a destination cluster that is different from the source cluster.

9. The computer-implemented method of claim 8, wherein identifying a virtual router through which to route network traffic of a specific network flow includes identifying a virtual router in the source cluster and a second virtual router in the destination cluster.

10. The computer-implemented method of claim 1, wherein the specific network flow has multiple destination virtual machines existing on multiple destination host machines in multiple clusters.

11. The computer-implemented method of claim 1, further comprising:
    expiring or removing the specific flow in response to determining that the specific flow has been idle for a predetermined amount of time.

12. The computer-implemented method of claim 1, further comprising:
    expiring or removing the specific flow in response to determining that the specific flow has been used below a threshold amount for a predetermined amount of time.

13. A system comprising:
one or more computers; and
one or more storage devices storing instructions that are operable, when executed by the one or more computers, to cause the one or more computers to perform operations comprising:
    identifying a virtual router through which to router network traffic of a specific network flow, wherein the specific network flow has a source endpoint existing on a source host machine and a destination endpoint existing on a destination host machine;
    receiving flow statistics of network traffic transiting the virtual router including statistics about the specific network flow;
    determining whether current network traffic of the specific network flow meets an offload rule using the received flow statistics by:

determining the number of network flows that have already been offloaded for the source host machine of the specific network flow; and determining whether the number of offloaded network flows exceeds a threshold amount for the source host machine; and in response to determining that the number of offloaded network flows does not exceed a threshold amount for the source host machine, dynamically offloading the specific network flow from the virtual router to ensure that subsequent network traffic of the specific network flow does not transit the virtual router.

14. The system of claim 13, wherein offloading the specific network flow from the virtual router further comprises:

creating a direct route between the source host machine and the destination host machine through which to route the specific network flow; and routing subsequent specific network flow traffic through the direct route instead of the virtual router.

15. The system of claim 13, wherein the virtual router is identified based on characteristics of the specific network flow and at least one flow key of the virtual router defining network traffic that the virtual router is programmed to handle.

16. The system of claim 13, wherein determining whether the specific network flow meets an offload rule includes:

comparing the specific network flow bandwidth with a predefined bandwidth; and determining that the specific network flow exceeds a bandwidth network flow when the specific network flow bandwidth is greater than the predefined bandwidth.

17. The system of claim 13, wherein receiving flow statistics includes receiving statistics about the bandwidth of the specific network flow.

18. The system of claim 13, wherein determining whether the specific network flow meets an offload rule includes:

determining an aggregate bandwidth flowing through the virtual router; and determining whether the aggregate bandwidth exceeds a threshold bandwidth for the virtual router.

19. The system of claim 13, wherein flow statistics are received from at least one source, wherein the at least one source is: the source or destination virtual machines, the source or destination hosts, a router on the destination host, a programmable software switch on the source or destination host, a network monitoring system, or the virtual router.

20. The system of claim 13, wherein the source host machine is in a source cluster and the destination host machine is in a destination cluster that is different from the source cluster.

21. The system of claim 20, wherein identifying a virtual router through which to route network traffic of a specific network flow includes a virtual router in the source cluster and a second virtual router in the destination cluster.

22. The system of claim 13, wherein the specific network flow has multiple destination virtual machines existing on multiple destination host machines in multiple clusters.

23. The system of claim 13, further comprising:

expiring or removing the specific flow in response to determining that the specific flow has been idle for a predetermined amount of time.

24. The system of claim 13, further comprising:

expiring or removing the specific flow in response to determining that the specific flow has been used below a threshold amount for a predetermined amount of time.

25. A non-transitory computer-readable medium storing software comprising instructions executable by one or more computers which, upon such execution, cause the one or more computers to perform operations comprising:

identifying a virtual router through which to route network traffic of a specific network flow, wherein the specific network flow has a source endpoint existing on a source host machine and a destination endpoint existing on a destination host machine;

receiving flow statistics of network traffic transiting the virtual router including statistics about the specific network flow;

determining whether current network traffic of the specific network flow meets an offload rule using the received flow statistics by:

determining the number of network flows that have already been offloaded for the source host machine of the specific network; and determining whether the number of offloaded network flows exceeds a threshold amount for the source host machine; and in response to determining that the number of offloaded network flows does not exceed a threshold amount for the source host machine, dynamically offloading the specific network flow from the virtual router to ensure that subsequent network traffic of the specific network flow does not transit the virtual router.

26. The non-transitory computer-readable medium of claim 25, wherein offloading the specific network flow from the virtual router further comprises:

creating a direct route between the source host machine and the destination host machine through which to route the specific network flow; and routing subsequent specific network flow traffic through the direct route instead of the virtual router.

27. The non-transitory computer-readable medium of claim 25, wherein the virtual router is identified based on characteristics of the specific network flow and at least one flow key of the virtual router defining network traffic that the virtual router is programmed to handle.

28. The non-transitory computer-readable medium of claim 25, wherein determining whether the specific network flow meets an offload rule includes:

comparing the specific network flow bandwidth with a predefined bandwidth; and determining that the specific network flow exceeds a bandwidth network flow when the specific network flow bandwidth is greater than the predefined bandwidth.

29. The non-transitory computer readable medium of claim 25, wherein receiving flow statistics includes receiving statistics about the bandwidth of the specific network flow.

30. The non-transitory computer readable medium of claim 25, wherein determining the specific network flow meets an offload rule includes:

determining an aggregate bandwidth flowing through the virtual router; and determining whether the aggregate bandwidth exceeds a threshold bandwidth for the virtual router.

31. The non-transitory computer readable medium of claim 25, wherein flow statistics are received from at least one source, wherein the at least one source is: the source or destination virtual machines, the source or destination hosts, a router on the destination host, a programmable software switch on the source or destination host, a network monitoring system, or the virtual router.

32. The non-transitory computer readable medium of claim 25, wherein the source host machine is in a source cluster and the destination host machine is in a destination cluster that is different from the source cluster.

33. The non-transitory computer readable medium of claim 32, wherein identifying a virtual router through which to route network traffic of a specific network flow includes identifying a virtual router in the source cluster and a second virtual router in the destination cluster.

34. The non-transitory computer readable medium of claim 25, wherein the specific network flow has multiple destination virtual machines existing on multiple destination host machines in multiple clusters.

35. The non-transitory computer readable medium of claim 25, further comprising:
   expiring or removing the specific flow in response to determining that the specific flow has been idle for a predetermined amount of time.

36. The non-transitory computer readable medium of claim 25, further comprising:
   expiring or removing the specific flow in response to determining that the specific flow has been used below a threshold amount for a predetermined amount of time.

* * * * *

UNITED STATES PATENT AND TRADEMARK OFFICE
CERTIFICATE OF CORRECTION

PATENT NO. : 10,193,968 B2
APPLICATION NO. : 15/294494
DATED : January 29, 2019
INVENTOR(S) : Alpert et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 53 days.

Signed and Sealed this
Third Day of September, 2019

Andrei Iancu
*Director of the United States Patent and Trademark Office*